(12) United States Patent
Jackson et al.

(10) Patent No.: US 10,992,333 B2
(45) Date of Patent: Apr. 27, 2021

(54) SMART PHONE HOLDER

(71) Applicant: AATC, LLC, Centennial, CO (US)

(72) Inventors: Walter A. Jackson, Centennial, CO (US); Sean W. Flickinger, Lakewood, CO (US)

(73) Assignee: AATC, LLC, Centennial, CO (US)

( * ) Notice: Subject to any disclaimer, the term of this patent is extended or adjusted under 35 U.S.C. 154(b) by 2 days.

(21) Appl. No.: 16/859,010

(22) Filed: Apr. 27, 2020

(65) Prior Publication Data

US 2020/0340508 A1 Oct. 29, 2020

Related U.S. Application Data

(63) Continuation of application No. 16/854,683, filed on Apr. 21, 2020.

(60) Provisional application No. 62/838,366, filed on Apr. 25, 2019.

(51) Int. Cl.
| | | |
|---|---|---|
| *H04M 1/04* | (2006.01) | |
| *F16B 2/12* | (2006.01) | |
| *F16M 11/04* | (2006.01) | |
| *H04B 1/3877* | (2015.01) | |
| *H04M 1/725* | (2021.01) | |
| *F16M 11/10* | (2006.01) | |

(52) U.S. Cl.
CPC ............ *H04B 1/3877* (2013.01); *F16B 2/12* (2013.01); *F16M 11/041* (2013.01); *H04M 1/04* (2013.01); *H04M 1/725* (2013.01); *A45F 2200/0516* (2013.01); *F16M 11/10* (2013.01)

(58) Field of Classification Search
CPC ......... A45F 2200/0516; H04B 1/3877; H04M 1/04; H04M 1/725
USPC ..................... 455/575.1, 575.6, 569.1, 575.8
See application file for complete search history.

(56) References Cited

U.S. PATENT DOCUMENTS

| | | | | |
|---|---|---|---|---|
| 8,333,353 | B1* | 12/2012 | Silverman .......... | F16M 11/2078 248/205.6 |
| 2006/0145040 | A1* | 7/2006 | Richter ............... | B60R 11/0241 248/310 |
| 2007/0045495 | A1* | 3/2007 | Asano ..................... | H04M 1/04 248/309.1 |
| 2007/0057004 | A1* | 3/2007 | Butler .................. | A45C 11/182 224/669 |
| 2009/0060473 | A1* | 3/2009 | Kohte .................. | F16M 11/041 386/200 |
| 2009/0305748 | A1* | 12/2009 | Piekarz ............... | B60R 11/0241 455/573 |
| 2012/0103921 | A1* | 5/2012 | Liu ........................ | F16M 11/10 211/26 |
| 2012/0318950 | A1* | 12/2012 | Wilber ................ | A47B 23/043 248/459 |

(Continued)

*Primary Examiner* — Tan H Trinh
(74) *Attorney, Agent, or Firm* — Fennemore Craig, P.C.

(57) ABSTRACT

A holder for holding a mobile device may include a back plate. A strut is operatively associated with the back plate so that the strut can be moved with respect to the back plate. A strut lock operatively associated with the back plate and the strut holds the back plate and strut in a desired position. A first jaw operatively associated with the back plate is sized to engage a portion of the mobile device. A second jaw sized to engage a portion of the mobile device is operatively associated with the back plate so that the second jaw can be moved toward and away from the first jaw to hold a mobile device therebetween.

14 Claims, 16 Drawing Sheets

(56) References Cited

U.S. PATENT DOCUMENTS

| | | | | |
|---|---|---|---|---|
| 2013/0240587 A1* | 9/2013 | Buchhalter | ............ | F16M 13/00 |
| | | | | 224/570 |
| 2013/0270413 A1* | 10/2013 | Wilber | ................. | A47B 23/043 |
| | | | | 248/558 |
| 2014/0124553 A1* | 5/2014 | Cruz | ........................ | B62B 9/26 |
| | | | | 224/409 |
| 2014/0151523 A1* | 6/2014 | Subbaraman | ........... | B43L 5/025 |
| | | | | 248/449 |
| 2014/0170977 A1* | 6/2014 | Ryan | .................. | B60R 11/0241 |
| | | | | 455/41.1 |
| 2014/0209777 A1* | 7/2014 | Klemin | .................. | F16M 11/10 |
| | | | | 248/544 |
| 2014/0263931 A1* | 9/2014 | Chen | ...................... | F16M 13/00 |
| | | | | 248/576 |
| 2015/0108317 A1* | 4/2015 | Cruz | ..................... | F16M 11/08 |
| | | | | 248/479 |
| 2015/0151690 A1* | 6/2015 | Mannarino | .......... | F16M 11/041 |
| | | | | 224/483 |
| 2016/0159480 A1* | 6/2016 | Barth | .................. | F16M 13/022 |
| | | | | 248/218.4 |
| 2016/0165025 A1* | 6/2016 | Sheu | ....................... | H04M 1/04 |
| | | | | 455/557 |
| 2016/0230921 A1* | 8/2016 | Fan | ........................ | F16M 13/04 |
| 2017/0187211 A1* | 6/2017 | Fan | ........................ | H02J 7/025 |
| 2017/0292647 A1* | 10/2017 | Loudon | .................. | F16M 11/38 |
| 2017/0334363 A1* | 11/2017 | Bekaert | ............... | B60R 11/0241 |
| 2018/0043840 A1* | 2/2018 | Minn | ..................... | B60R 11/02 |
| 2018/0111690 A1* | 4/2018 | Zheng | ............... | B64D 11/00152 |
| 2018/0149302 A1* | 5/2018 | Papapanos | .......... | B60R 11/0258 |
| 2018/0251080 A1* | 9/2018 | McLaughlin | ....... | B60R 11/0241 |
| 2018/0345875 A1* | 12/2018 | Buchhalter | .......... | F16M 11/041 |
| 2018/0375980 A1* | 12/2018 | Renfrow | ................ | F16M 13/00 |
| 2019/0291804 A1* | 9/2019 | Yu | ............................ | B62J 11/00 |
| 2020/0343924 A1* | 10/2020 | Jackson | ................... | F16B 2/12 |

\* cited by examiner

SMART PHONE HOLDER

CROSS-REFERENCE TO RELATED APPLICATIONS

This application is a continuation of co-pending U.S. patent application Ser. No. 16/854,683, filed on Apr. 21, 2020, which claims the benefit of U.S. Provisional Patent Application No. 62/838,366, filed on Apr. 25, 2019, both of which are hereby incorporated herein by reference for all that they disclose.

TECHNICAL FIELD

The present invention relates to accessories for mobile devices in general and more particularly to holders for mobile devices.

BACKGROUND

Mobile devices, such as cellular phones, "smart" phones, handheld computers, digital media players, personal digital assistants, tablets, game consoles, and the like are well-known in the art and are widely used for a wide variety of purposes and in a wide range of situations and environments. While numerous types of aftermarket external cases have been developed for such mobile devices, the purpose of such external cases is primarily directed to providing an extra level of physical protection for the mobile devices. They are not generally focused on enhancing the use of such devices, such as providing convenient, hands-free operation.

While various types of expanding grips have been developed and can be adhered to the back sides of mobile devices to assist users in holding and manipulating such mobile devices, they do not provide a particularly stable means of holding the mobile device in a hands-free position. Even if a user is successful in positioning a mobile device with such an expanding grip in a stable, hands-free position, the position is not really adjustable. For example, the user typically cannot easily adjust the viewing angle of the device. While other types of mounting systems have been developed to allow such devices to be more easily used in a hands-free mode, such as in automobiles, delivery trucks, and the like, such mounting systems are typically specifically adapted for automobile use and do not readily lend themselves to use in other situations or environments. Indeed, such mounting systems are commonly configured to be more or less permanently attached to the vehicle, thereby limiting the ability of the user to remove the mounting system to allow the mobile device to be used in other situations or environments.

SUMMARY OF THE INVENTION

One embodiment of a holder for holding a mobile device may include a back plate. A strut is operatively associated with the back plate so that the strut can be moved with respect to the back plate. A strut lock operatively associated with the back plate and the strut holds the back plate and strut in a desired position. A first jaw operatively associated with the back plate is sized to engage a portion of the mobile device. A second jaw sized to engage a portion of the mobile device is operatively associated with the back plate so that the second jaw can be moved toward and away from the first jaw to hold a mobile device therebetween.

Also disclosed is a method of holding a mobile device in a desired position that may include the steps of: Providing a mobile device holder; positioning a back surface of the mobile device in abutting relationship with a back plate of the mobile device holder so that at least a portion of a first jaw of the mobile device holder is engaged with at least a portion of the mobile device; moving a second jaw of the mobile device holder until at least a portion of the second jaw is engaged with at least a portion of the mobile device; moving a strut of the mobile device holder to a desired position, the strut lock holding the strut in the desired position.

Another method of holding a mobile device in a desired position may include the steps of: Providing a mobile device holder; positioning a back surface of the mobile device in abutting relationship with the back plate of the mobile device holder so that at least a portion of the first jaw of the mobile device holder is engaged with a portion of the mobile device; moving the second jaw of the mobile device holder until at least a portion of the second jaw is engaged with a portion of the mobile device; and urging the strut against a surface with a force sufficient to engage a securing material provided on the strut with the surface, the securing material holding the holder and attached mobile device to the surface.

Also disclosed is a holder for holding a mobile device that includes a base member that defines a back plate portion and a strut portion. The strut portion is connected to the back plate portion by a hinge portion. An opening formed in the strut portion defines a spreader member. An opening formed in the back plate portion defines a first jaw. An opening defined in the back plate portion is sized to releasably engage the spreader member. The holder also includes a slider member having end portions that define respective lips so that respective channels are defined between the lips and the slider member. The channels are sized to slidably receive the back plate portion defined by the base member. An opening defined in the slider member defines a second jaw. The slider member is moveable with respect to the back plate portion so that the second jaw can be moved toward and away from the first jaw to hold a mobile device therebetween.

Another holder for holding a mobile device may include a generally rectangularly-shaped base member defining a back plate portion, a strut portion, and a slider portion. The strut portion is connected to the back plate portion by a hinge portion. The strut portion includes an opening formed therein that defines a spreader member. The back plate portion includes a first opening formed therein that defines a first jaw, a second opening therein that is sized to releasably engage the spreader member, and a third opening therein that slidably receives the slider portion. The slider portion includes an opening formed therein that defines a second jaw. The slider portion is connected to the back plate portion by an expanded mesh portion. The expanded mesh portion biases the second jaw on the slider toward the first jaw.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
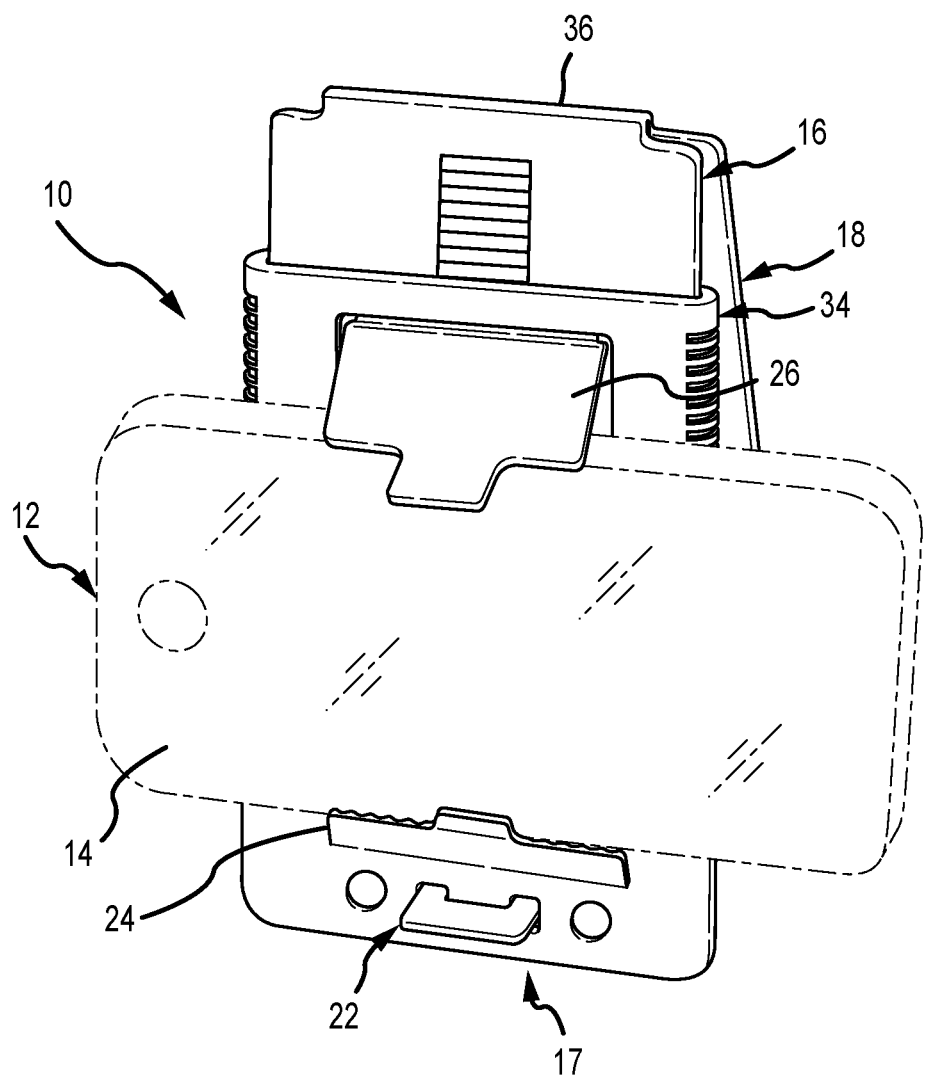
FIG. 1 is a partial front view in perspective of one embodiment of a mobile device holder shown holding a mobile device in a 'landscape' orientation.
Figure 2:
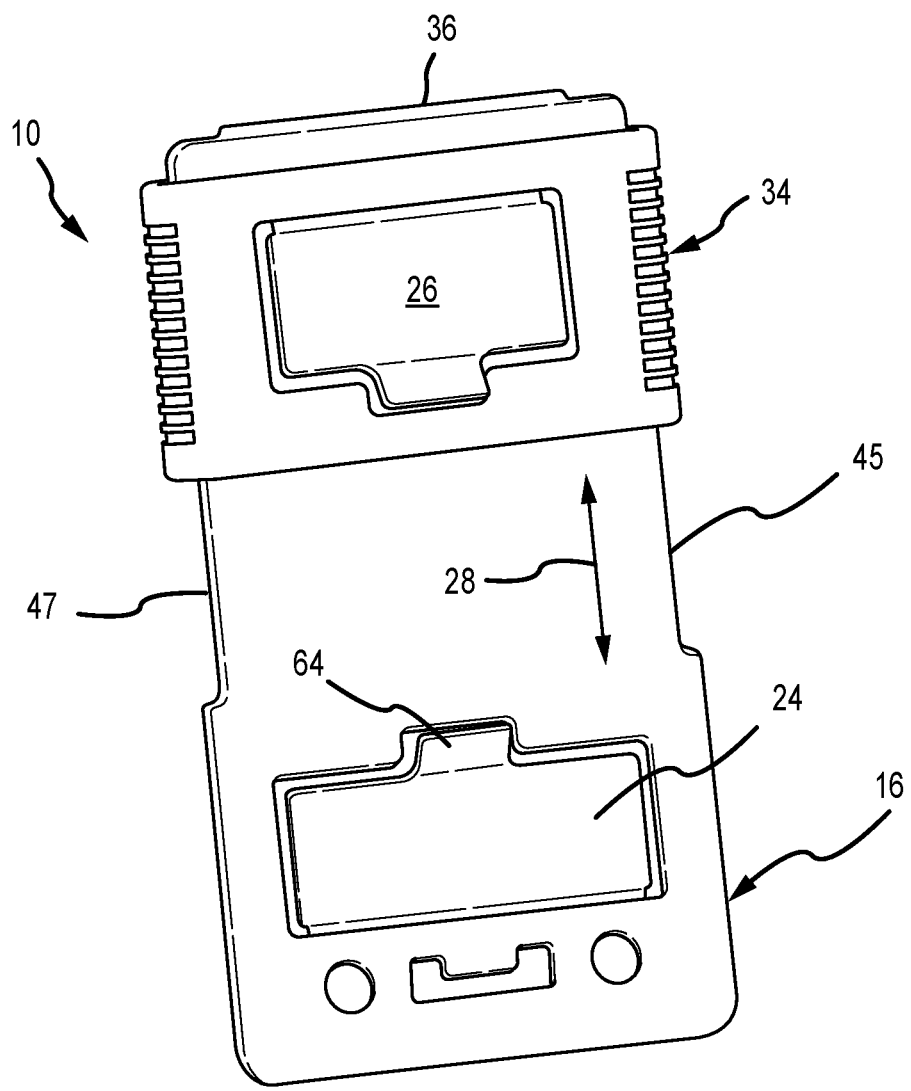
FIG. 2 is a partial front view in perspective of the mobile device holder illustrated in FIG. 1 with the mobile device removed to more clearly show the arrangement of the slider and first and second jaws.
Figure 3:
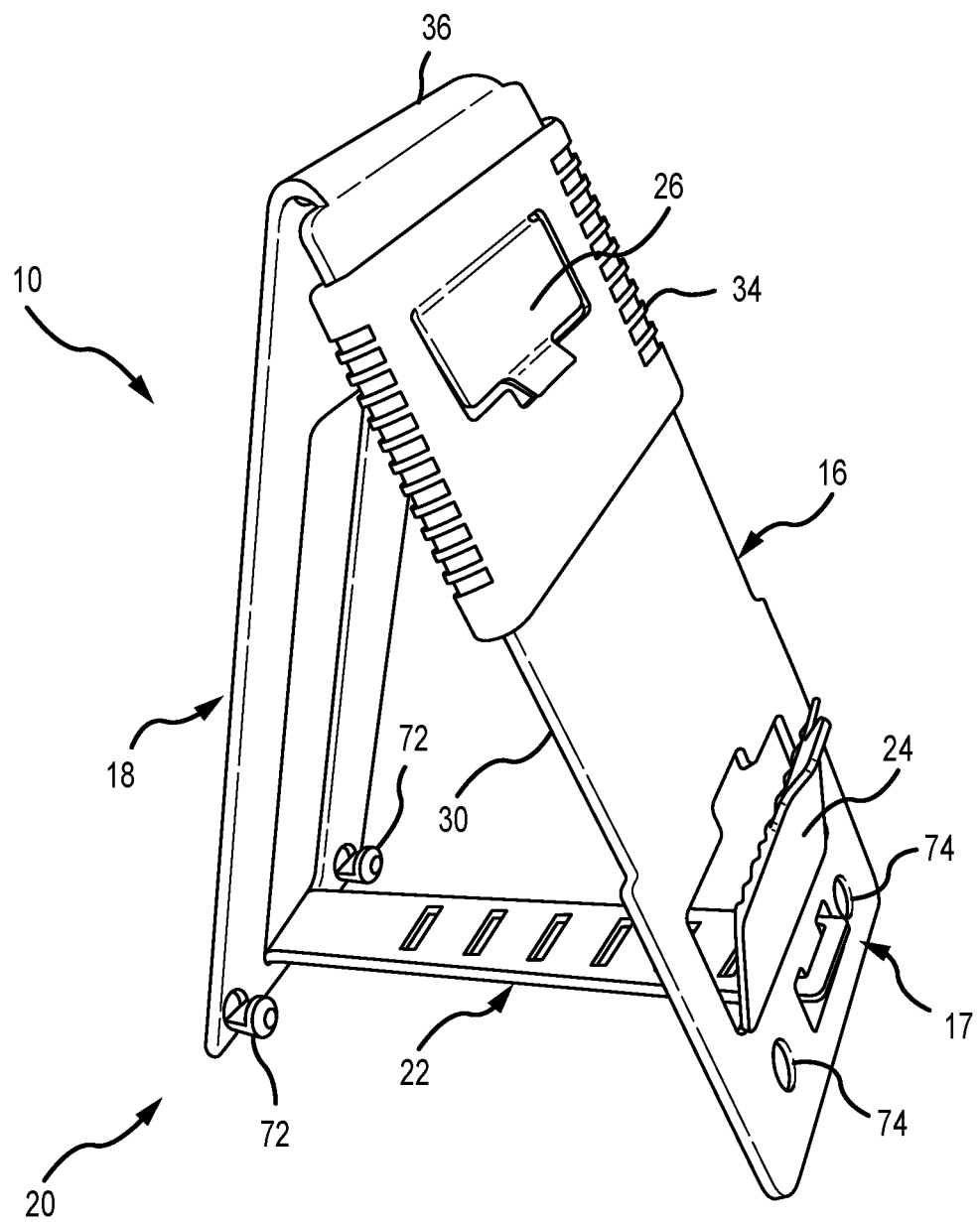
FIG. 3 is a partial side view in perspective of the mobile device holder more clearly showing the arrangement of the strut and spreader.

One embodiment of a mobile device holder 10 is illustrated in FIG. 1 as it may be used to hold a mobile device 12 to allow a user (not shown) to conveniently view a display screen 14 of mobile device 12, typically in a hands-free manner. With reference now primarily to FIGS. 1-3, the mobile device holder may comprise a back plate 16 and a strut 18 operatively associated with the back plate 16 so that the strut 18 may be moved with respect to the back plate 16. In the various embodiments shown and described herein, the arrangement is such that the back plate 16 and strut 18 may be moved between an opened position 20, illustrated in FIGS. 1-3, and a closed position 21, illustrated in FIG. 4. When in the closed position 21, the strut 18 and spreader 22 are in abutting relation with the rear side 30 of back plate 16. A strut lock 17 operatively associated with the back plate 16 and strut 18 may be used to hold the back plate 16 and strut 18 in a desired position, such as opened position 20, closed position 21, or any other desired position between the opened and closed positions 20 and 21. In one embodiment, strut lock 17 may comprise a spreader 22, although other arrangements are possible, as will be described in further detail below.

Figure 4:
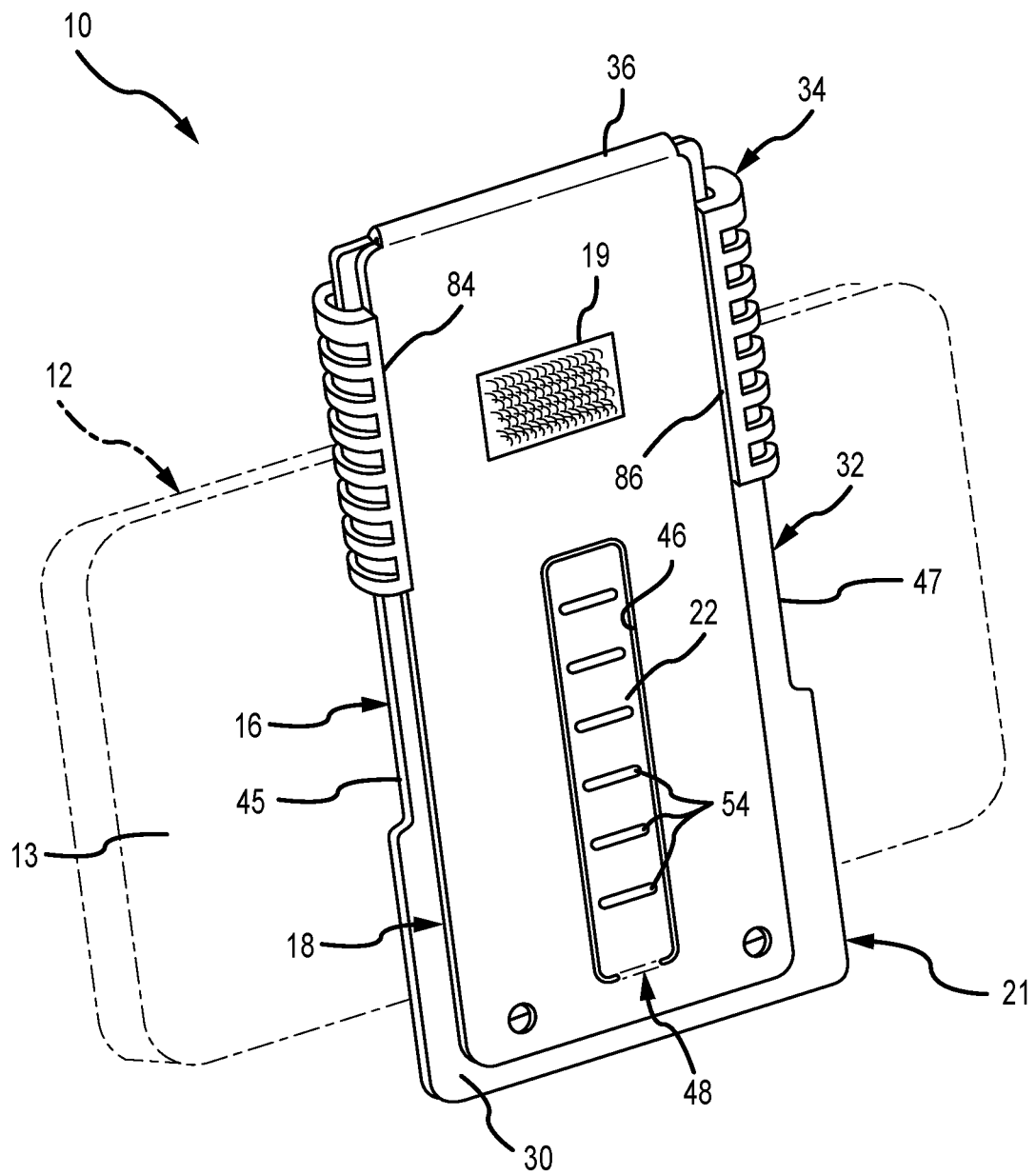
FIG. 4 is a partial rear view in perspective of the mobile device holder shown in the closed position.
Figure 7:
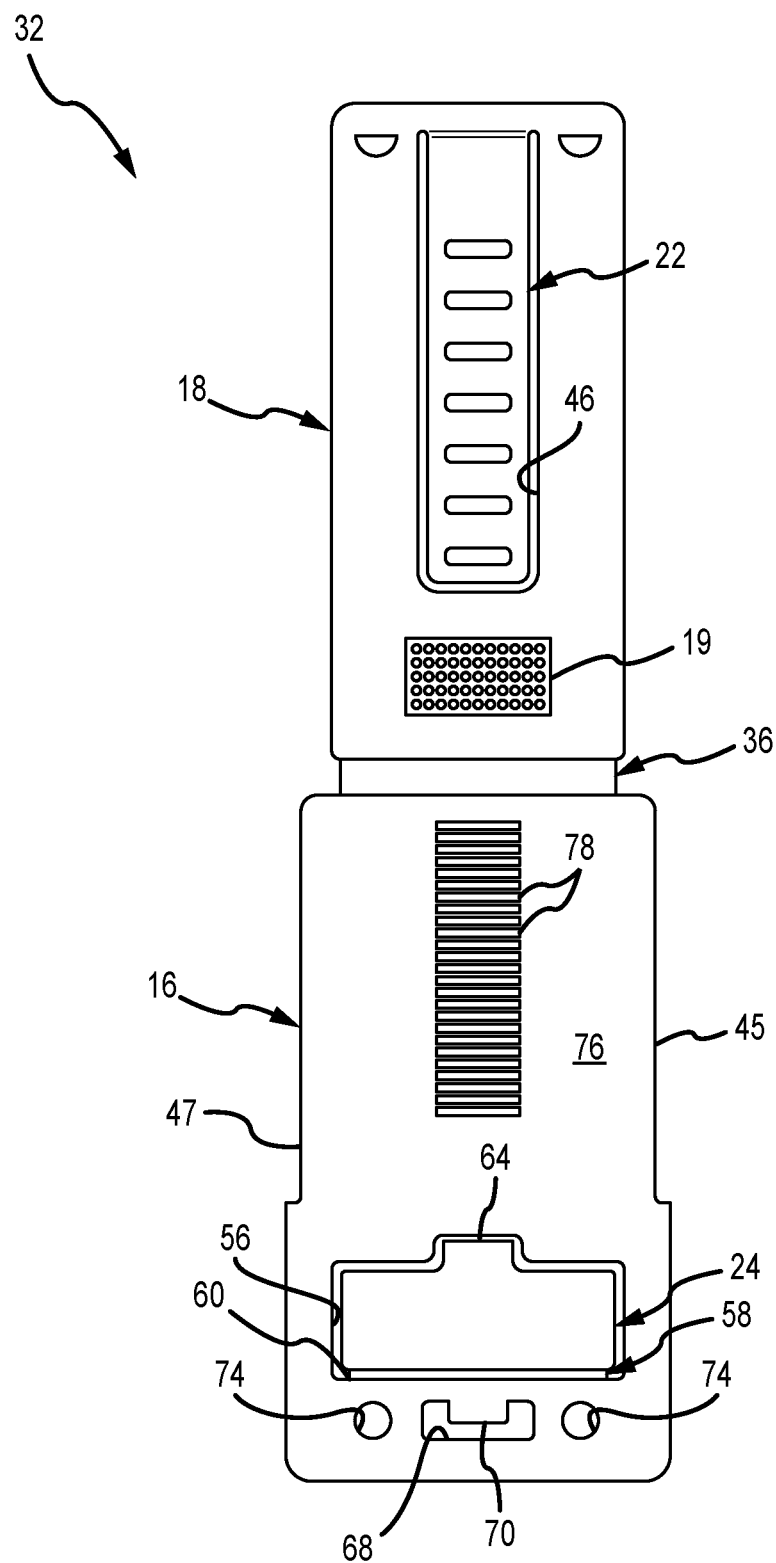
FIG. 7 is a plan view of a front side of the base member.
Figure 8:
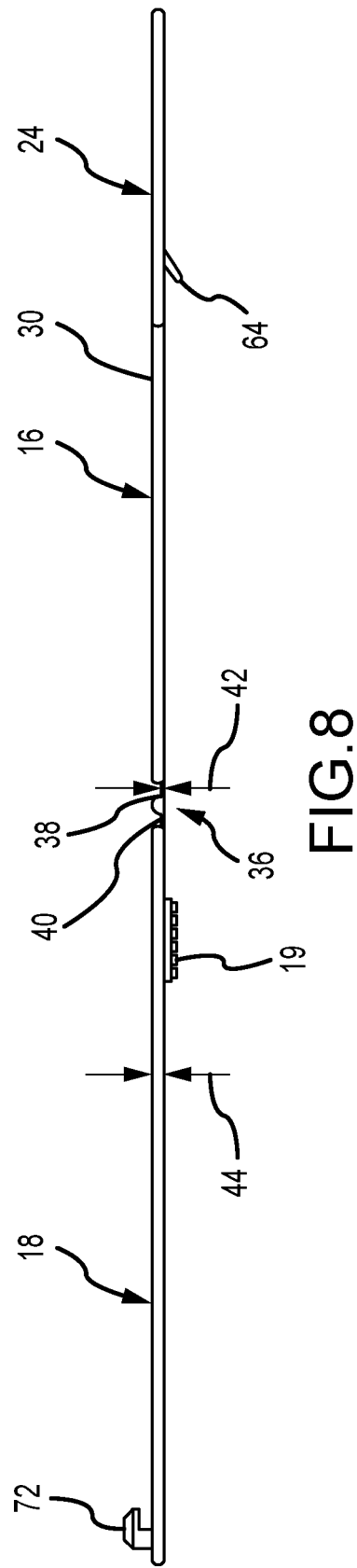
FIG. 8 is a side view in elevation of the base member.

In some embodiments, the back surface of strut 18 may be provided with a securing material 19, as best seen in FIGS. 4, 7, and 8. Securing material 19 may be used to allow the mobile device holder 10 to be secured to a surface (e.g., a seat back or tray table) for easy viewing of the display screen 14 of mobile device 12. In one embodiment, securing material 19 may comprise a hook portion of a hook-and-loop fastening system (not shown), although other arrangements are possible, as will be described in greater detail below.

Mobile device holder 10 may also comprise a first jaw 24 operatively associated with back plate 16. First jaw 24 is configured to engage a portion of the mobile device 12 to hold the mobile device 12 in the desired position. Mobile device holder 10 may also comprise a second jaw 26 that is also configured to engage a portion of the mobile device 12. In one embodiment, second jaw 26 is slidably mounted to the back plate 16 so that the second jaw 26 can be moved toward and away from the first jaw 24, generally in the directions indicated by arrow 28 (FIG. 2). The moveable second jaw 26 allows mobile device holder 10 to be used with mobile devices 12 having a wide range of sizes and allows them to be held in either a 'landscape' or a 'portrait' orientation.

A significant advantage of the holder 10 of the present invention is that it allows a user to securely hold the mobile device 12 in any of a wide range of positions and orientations (e.g., in the landscape or portrait orientations) to allow for the convenient, hands-free operation of the mobile device 12. For example, the mobile device holder 10 may be used to hold the mobile device 12 for convenient hands-free, long-term viewing of the display screen 14, such as may be desirable when watching movies or videos. When not in use, mobile device 12 may be easily removed from the mobile device holder 10. Mobile device holder 10 may then be broken down or folded into the closed position 21 (FIG. 4) for convenient transport or storage. Again, when in the folded or closed position 21, the various elements and components of the mobile device holder 10 may lie flat against one another, thereby reducing the overall thickness of the holder 10. The reduced overall thickness allows the holder 10 to be conveniently carried or stored, such as, for example, in a shirt pocket or purse.

In embodiments provided with a securing material 19 on the back side of strut 18, the securing material 19 may be used to releasably affix the mobile device holder 10 to any of a wide range of surfaces (e.g., seat-backs, tray tables, etc.) to allow the mobile device 10 to be easily used and/or viewed in a hands-free mode. The cooperative engagement of the strut 18 and strut lock 17, e.g., spreader 22 in one embodiment, also allow for viewing adjustment not only on a horizontal surface, such as a table-top, but on angled surfaces as well, such as a reclined seat back or the dashboard of an automobile. The spreader 22 may be adjusted so that the display screen 14 of mobile device 12 is positioned at a desired or convenient viewing angle. The mobile device holder 10 may also be turned on its side to allow viewing as well, with the opened strut 18 providing stability.

Having briefly described one embodiment of the mobile device holder 10, as well as some of its more significant features and advantages, various embodiments and alternative configurations of the mobile device holder will now be described in detail.

Figure 9:
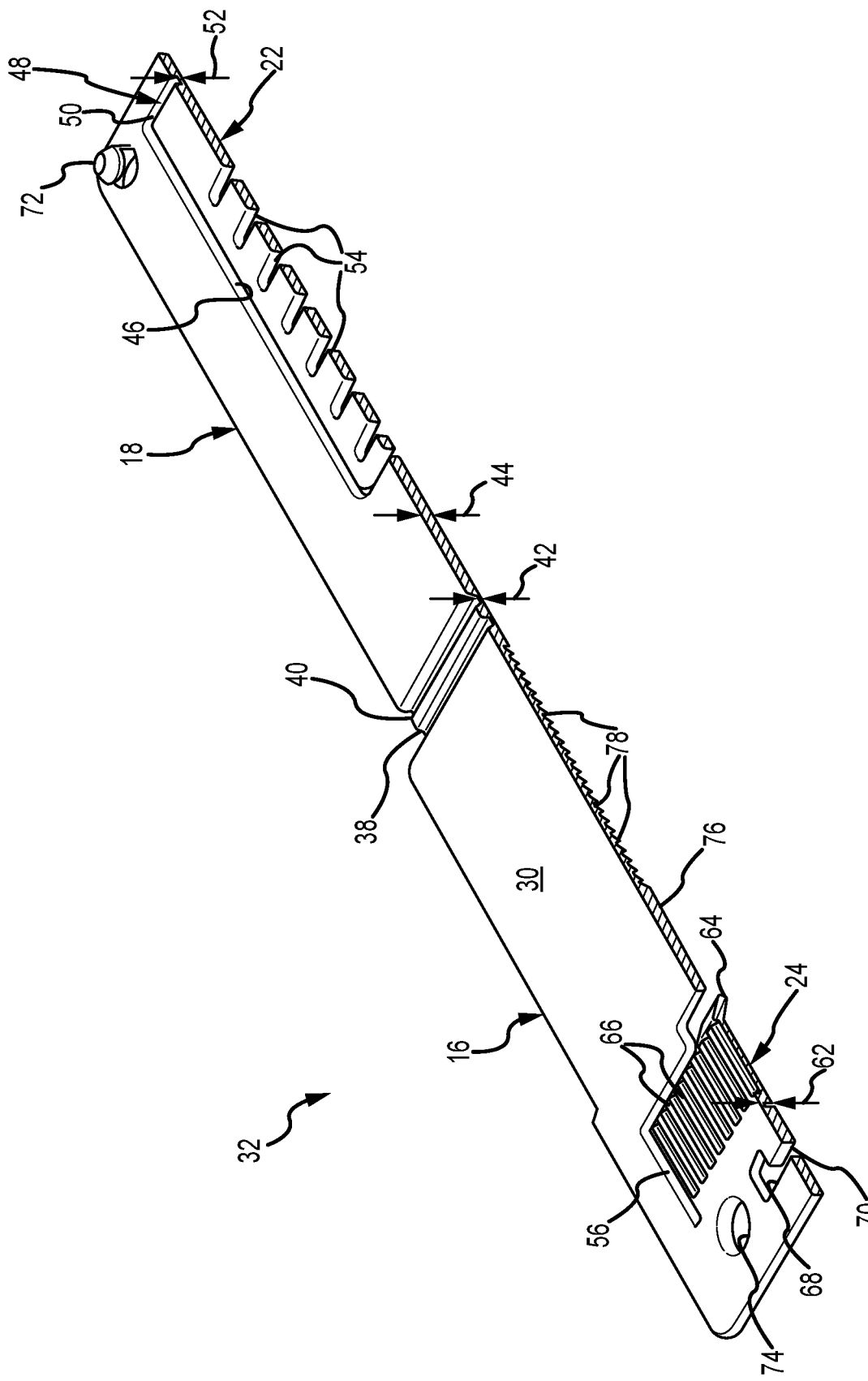
FIG. 9 is a sectional view in perspective of the base member taken along the line 9-9 of FIG. 5.
Figure 10:
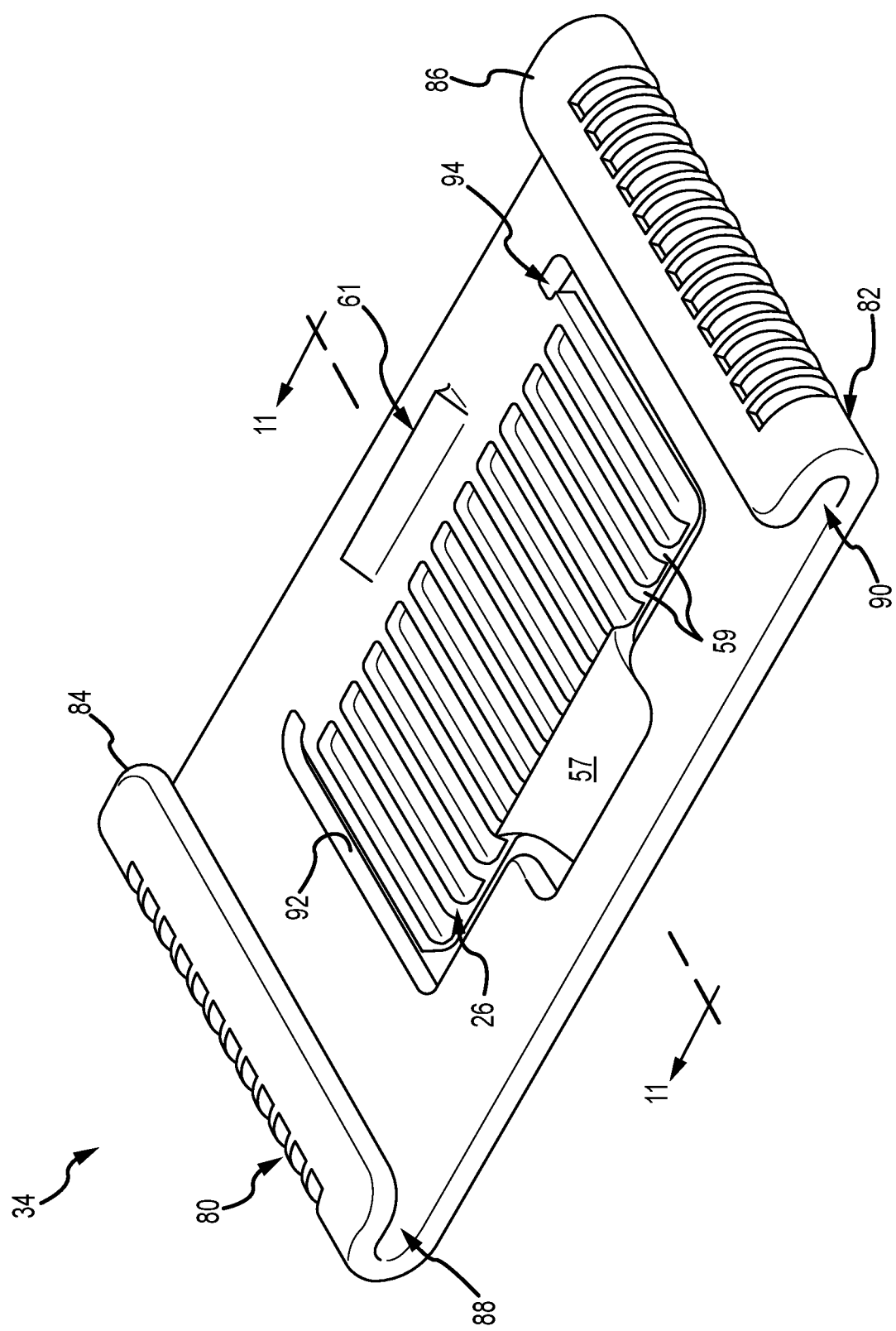
FIG. 10 is a perspective view of one embodiment of a slider member of the mobile device holder.
Figure 11:
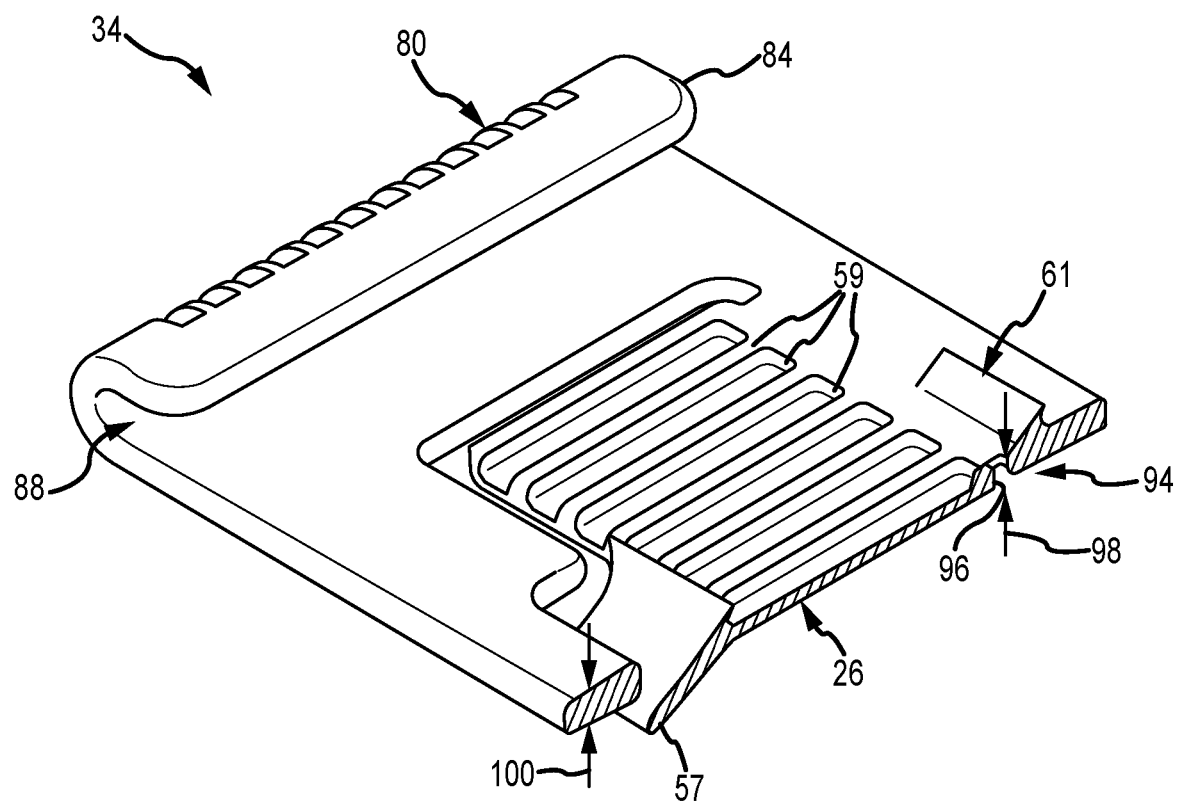
FIG. 11 is a sectional view in perspective of the slider member taken along the line 11-11 of FIG. 10.

Referring now primarily to FIGS. 5-11, with occasional reference to FIGS. 1-4, one embodiment of the mobile device holder 10 may comprise a two piece assembly comprising a base member 32, illustrated in FIGS. 5-9, and a slider member 34, illustrated in FIGS. 10 and 11. Normally, the two pieces (e.g., base member 32 and slider member 34) may remain in an assembled position, although they could be separated for cleaning and/or storage. Base member 32 may comprise the back plate 16, strut 18, spreader 22, and first jaw 24, whereas slider member 34 may comprise the second jaw 26. Base member 32 and slider member 34 may also comprise certain other elements and features, as will be described in further detail herein.

More specifically and with reference now to FIGS. 5-9, base member 32 may comprise a generally elongate, rectangularly-shaped member that defines a back plate portion 16 having two generally parallel opposed edges 45 and 47 and a strut portion 18. Back plate portion 16 and strut portion 18 are connected together by a hinge portion 36. In one embodiment, hinge portion 36 may comprise a pair of generally elongate transverse sections 38 and 40 having thicknesses 42 that are less than the respective thicknesses 44 of the back plate and strut portions 16 and 18, as best seen in FIGS. 8 and 9. Hinge portion 36 allows the back plate and strut portions 16 and 18 to be pivotally moved or folded with respect to one another between the opened position 20 (FIG. 3) and the closed position 21 (FIG. 4).

In one embodiment, spreader member 22 of mobile device holder 10 may be defined within the strut member 18 by a generally U-shaped opening 46 formed in strut member 18. See FIGS. 5-7. The 'open' end of the U-shaped opening 46 may define a hinge portion 48 that allows spreader member 22 to be pivotally moved or folded with respect to the strut member 18. In one embodiment, hinge portion 48 may comprise a generally elongate, transverse section 50 having a thickness 52 that is less than the respective thicknesses 44 of the spreader and strut members 18 and 22, as best seen in FIG. 9. Spreader member 22 may also define a plurality of adjustment slots 54 therein that are positioned in generally parallel, spaced apart relation along the length of spreader member 22.

Figure 5:
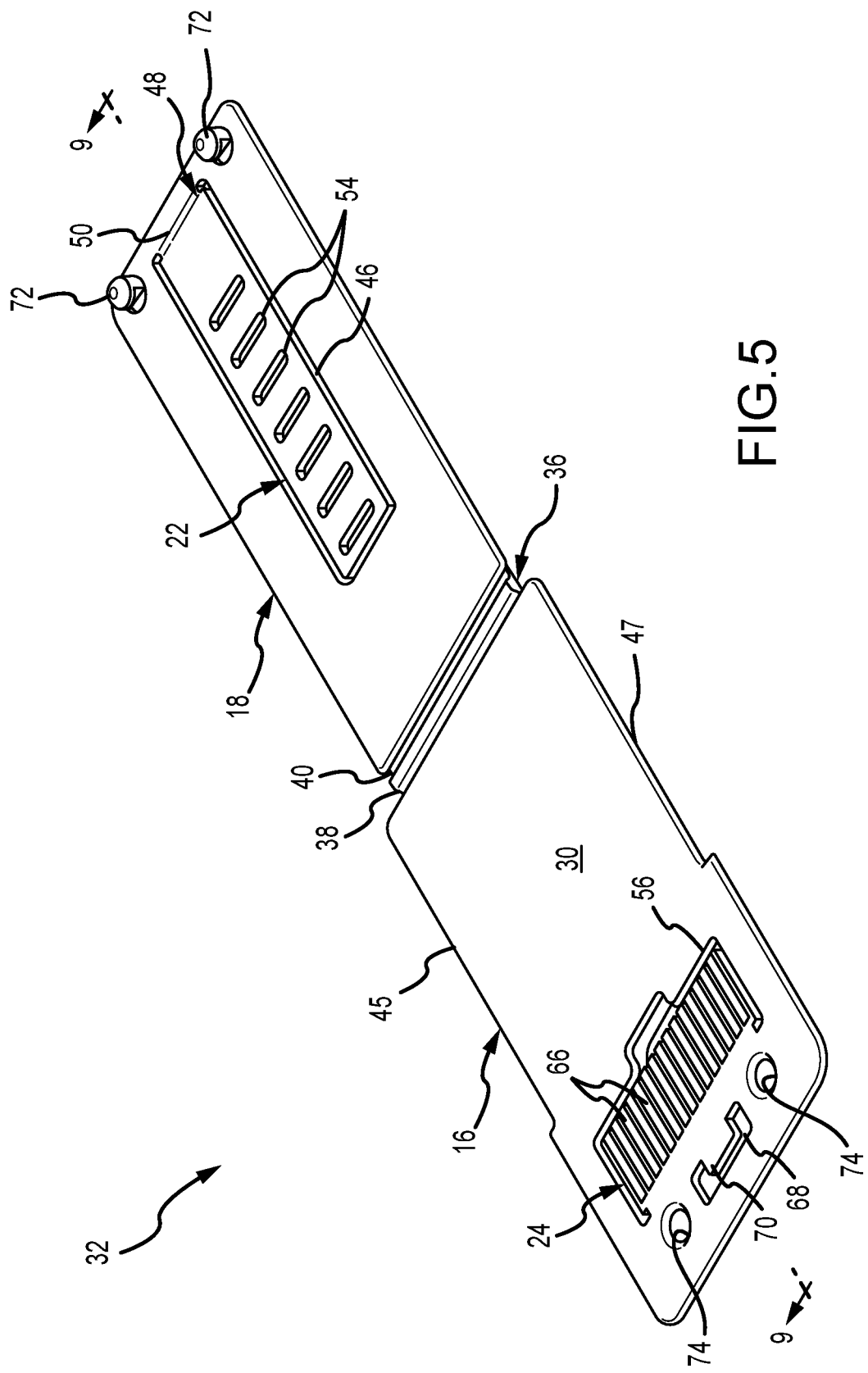
FIG. 5 is a perspective view of a rear side of one embodiment of a base member of the mobile device holder.
Figure 6:
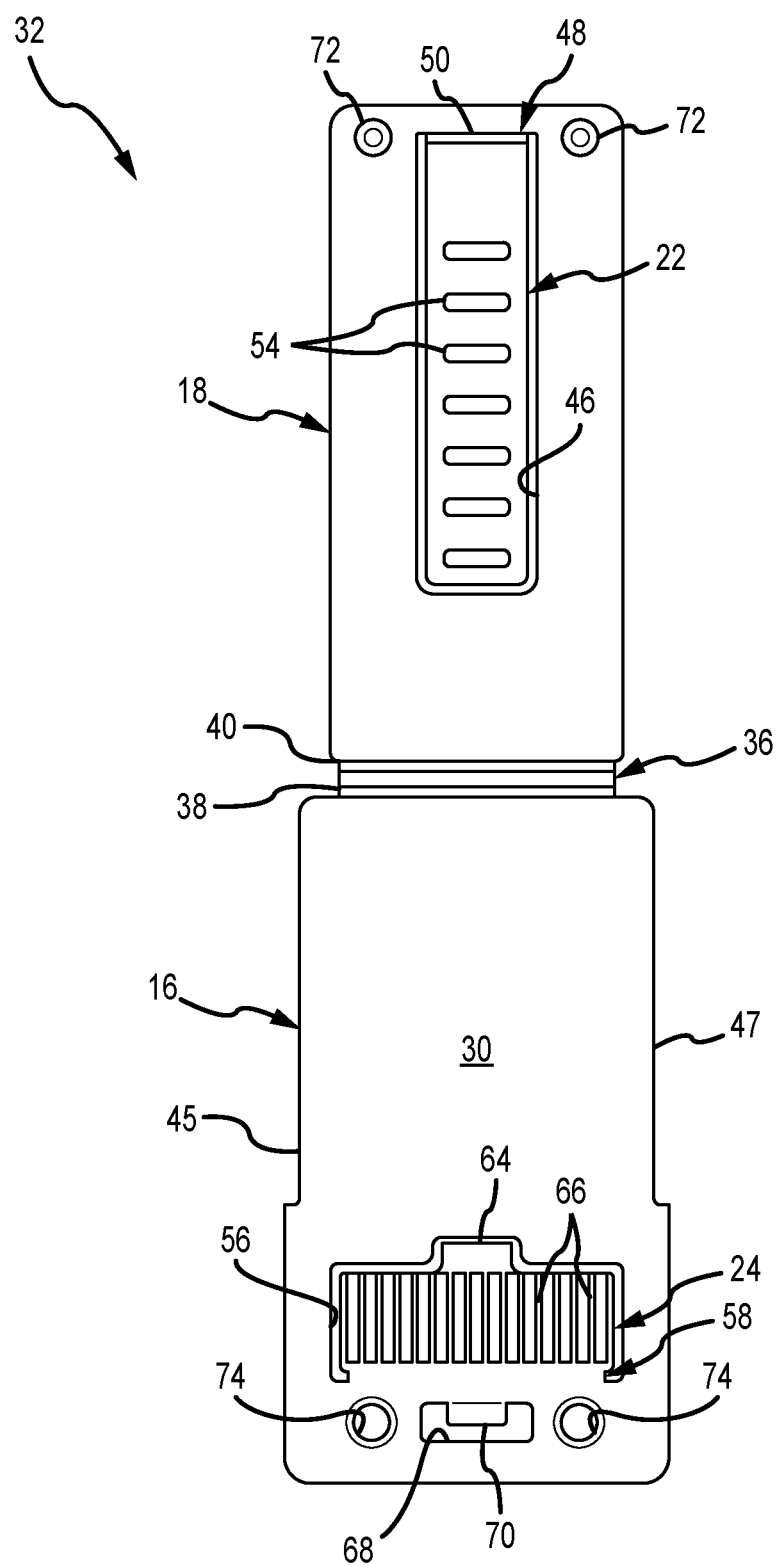
FIG. 6 is a plan view of the rear side of the base member.

The first jaw 24 of mobile device holder 10 may be defined within back plate member 16 by a generally U-shaped opening 56 formed in back member 16, as best seen in FIGS. 5-7. The 'open' end of U-shaped opening 56 defines a hinge portion 58 (best seen in FIG. 7) that allows the first jaw 24 to be pivotally moved or folded with respect to the back plate member 16. In one embodiment, hinge portion 58 may comprise a generally elongate, transverse section 60 having a thickness 62 that is less than the respective thicknesses 44 of the back plate and first jaw member 16 and 22, as best seen in FIG. 9. In one embodiment, first jaw 24 may be provided with a finger portion 64 (best seen in FIGS. 6-9) to allow a user (not shown) to more readily pivot the first jaw 24 with respect to the back plate member 16 to thus more easily manipulate and engage the first jaw 24 with mobile device 12. See also FIG. 1. First jaw 24 may also be provided with a plurality of grooves 66 provided therein to enhance the frictional engagement of first jaw 24 with mobile device 12.

Back plate 16 may also be provided with a slot or opening 68 therein that is sized to receive spreader 22. Slot or opening 68 may be provided with a tongue 70 that is sized to receive and engage the slots 54 provided in spreader 22. The engagement of the desired slot 54 and tongue 70 will allow the user (not shown) to change the angle at which the mobile device 12 is held by the holder 10. See FIG. 3. Together, the engagement of the spreader 22 with opening 68 in the back plate 16 define the strut lock 17.

If desired, base member 32 may be provided with one or more lugs 72 sized to be engagably received by corresponding openings or holes 74. When the base plate 16 and strut 18 are folded together (i.e., in abutting relation), the engagement of the lugs 72 and openings or holes 74 securely hold the base plate 16 and strut 18 in the closed position 21.

As mentioned earlier, the back surface of strut 18 may be provided with a securing material 19 (FIGS. 4, 7, and 8) to allow the mobile device holder 10 to be secured to a surface (e.g., a seat back or tray table). In one embodiment, securing material 19 may comprise a hook portion of a hook-and-loop fastening system (not shown). As is known, hook-and-loop fastening systems involve a hook portion and a loop portion that may be releasably engaged with one another. In one embodiment, the hook portion of securing material 19 may comprise a separate member that may be affixed to strut 18. Alternatively, hook portion of securing material 19 may be molded into the strut 18 during manufacture, in which case securing material 19 will comprise an integral portion of strut 18. In still another variation, the securing material 19 may comprise the loop portion of the hook-and-loop fastening system. In still yet another embodiment, the securing material 19 may comprise a double-sided adhesive material, such as a double-sided adhesive foam material, or any of a wide variety of other mounting systems, such as adhesive-based or magnetic mounting systems, known in the art or that may be developed in the future that would allow the mobile device holder 10 to be secured or mounted to any of a wide variety of surfaces. Consequently, the present invention should not be regarded as limited to any particular type of securing material 19.

Front side 76 of base member 32 may be provided with a plurality of ratchet members or teeth 78 therein, as best seen in FIGS. 7 and 9. As will be described in greater detail below, a pawl 61 provided on slider member 34 is sized to engage at least one tooth 78 to hold the second jaw 26 in a defined position with respect to first jaw 24. The engagement of the pawl 61 and at least one tooth 78 allow the first and second jaws 24 and 26 to securely hold the mobile device 12 within holder 10.

Base member 32 may be fabricated from any of a wide range of materials, provided such materials provide the required movement of the various hinge portions (e.g., 36, 48, and 58) without fracture, either initially or after repeated flexure. By way of example, in one embodiment, base member 32 is fabricated from polypropylene plastic. The thickness 44 of base member 32 may be in a range of about 1 mm to about 3 mm (about 2.3 mm preferred). The reduced thicknesses 42, 52, and 62 of the various transverse sections 38, 40, 50, and 60 that define or form the respective hinge portions 36, 48, and 58, may be in a range of about 0.3 mm to about 0.7 mm (about 0.5 mm preferred). Alternatively, the various thicknesses may be different if base member 32 is fabricated from different materials.

Referring now primarily to FIGS. 10 and 11, slider member 34 may comprise a generally rectangularly-shaped member having end portions 80 and 82 that define respective upturned flanges or lips 84 and 86 so that respective channels 88 and 90 are defined between the flanges or lips 84 and 86 and the slider member 34. The channels 88 and 90 are sized to be slidably received by the edges 45 and 47, respectively, of back plate 16 of base member 32, as best seen in FIG. 4.

The second jaw 26 of mobile device holder 10 may be defined within slider member 34 by a generally U-shaped opening 92 formed in slider member 34. The 'open' end of the U-shaped opening 56 may define a hinge portion 94 that allows the second jaw 26 to be pivoted or folded with respect to the slider member 34. In one embodiment, hinge portion 94 may comprise a generally elongate, transverse section 96 having a thickness 98 that is less than a thickness 100 of the slider member 34, as best seen in FIG. 11. In one embodiment, second jaw 26 may be provided with a finger portion 57 to allow a user (not shown) to more easily fold or pivot the second jaw 26 with respect to the slider member 34, thereby allowing more easy engagement with the mobile device 12. See also FIG. 1. Second jaw 26 may also be provided with a plurality of grooves 59 defined therein to enhance the engagement of second jaw 26 with mobile device 12. Slider member 34 may also be provided with a pawl 61 thereon that is sized and positioned to engage the teeth 78 provided on the front side 76 of base member 32. The engagement of the pawl 61 with the teeth 78 holds the slider member 34 and second jaw 26 in a defined position with respect to first jaw 24, thereby securely holding mobile device 12. See also FIG. 1.

Slider member 34 may be fabricated from any of a wide range of materials, provided such materials provide the required movement of the hinge portion 94 without fracture, either initially or after repeated flexure. By way of example, in one embodiment, slider member 34 is fabricated from polypropylene plastic. The thickness 100 of slider member 34 may be in a range of about 1 mm to about 3 mm (about 2.3 mm preferred). The reduced thickness 98 of the transverse section 96 forming the hinge portion 94, may be in a range of about 0.3 mm to about 0.7 mm (about 0.5 mm preferred). Alternatively, the various thicknesses may be different if slider member 34 is fabricated from different materials.

The mobile device holder 10 may be used to hold a mobile device 12 in a desired position for use. A first step in the method would be to position a back surface 13 of the mobile device in abutting relationship with the back plate 16 of mobile device holder 10 so that at least a portion of a first jaw 24 is engaged with at least a portion of the mobile device 12. If necessary, the user (not shown) may use the finger 64 of first jaw 24 to extend first jaw 24 away from the back plate 16 and engage the mobile device 12. Next, the user would move or slide the second jaw 26 along the back plate 16 until at least a portion of the second jaw 26 is engaged with the mobile device 12. Here again, the user may use the finger 57 of second jaw 26 to extend the second jaw 26 away from the slider member 34 and engage the mobile device 12. The engagement of the pawl 61 of slider member 34 with the teeth 78 provided on back plate 16 will securely hold or 'lock' the second jaw 26 in the engaged position. Next, the user could move or unfold the strut 18 away from the back plate 16 to a desired position and engage the spreader 22 with the tongue 70 provided on back plate 16 to hold or 'lock' the strut 18 in the desired position.

Alternatively, and in embodiments having a securing material 19 provided on the strut 18, a user may secure the mobile device 12 to the holder 10 in the manner described above. However, instead of extending the strut 18 and engaging the spreader 22, the user could simply urge the holder 10 against a desired surface (e.g., a seat back or tray table) with a force sufficient to engage the securing material 19 with the surface. If the surface is reclined, the user could extend the strut 18 and engage the spreader 22 to hold the mobile device at a convenient viewing angle.

Figure 12:
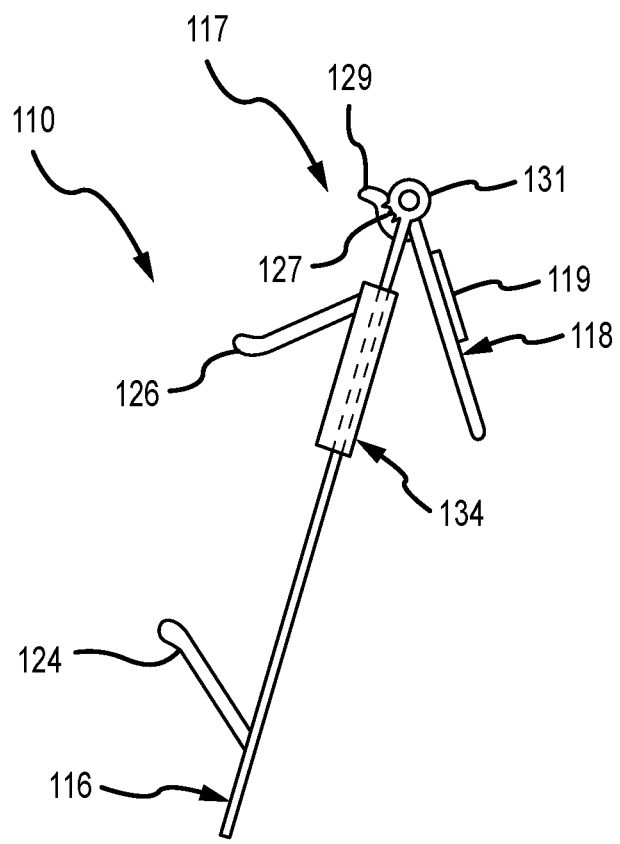
FIG. 12 is a side view in elevation of another embodiment of the mobile device holder wherein the strut lock comprises a first type of ratchet assembly for holding the strut and the back plate in a desired position.

Still other embodiments of the mobile device holder according to the teachings provided herein are possible. For example, another embodiment 110 of a mobile device holder illustrated in FIG. 12 may comprise a back plate 116 and a shortened strut 118. Shortened strut 118 may be provided with a securing member 119 thereon to allow the shortened strut 118 to be secured to a mounting surface, such as a seat back or tray table, in the manner already described. Alternatively, a full length strut, such as strut 18, could be provided. Shortened strut 118 may be pivotally mounted to back plate 116 by means of a pivot shaft 131 so that strut 118 may be moved between the opened and closed position. A strut lock 117 operatively associated with the back plate 116 and strut 118 holds the back plate 116 and strut 118 in one or more defined positions, i.e., either the opened position, the closed position, or some position in between. In the particular embodiment illustrated in FIG. 12, strut lock 117 comprises a ratchet assembly wherein a set of teeth 127 provided on pivot shaft 131 are sized to engage a pawl 129 provided on strut 118. The engagement of the pawl 129 with the teeth 127 holds the strut 118 in any of a range of defined positions.

The back plate 116 of mobile device holder 110 may be provided with first jaw 124 which may be substantially similar to the first jaw 24 already described. A slider member 134 provided with an second jaw 126 may be slidably mounted to the back plate 116 so that the second jaw 126 can be moved toward and away from first jaw 124 to accommodate a wide range of mobile devices in the manner already described. Slider member 134 and second jaw 126 may be substantially identical to the slider member 34 and second jaw 26 of holder 10. The various components of holder 110 may be fabricated in the same way and from the same type of materials as those already described for holder 10.

Figure 13:
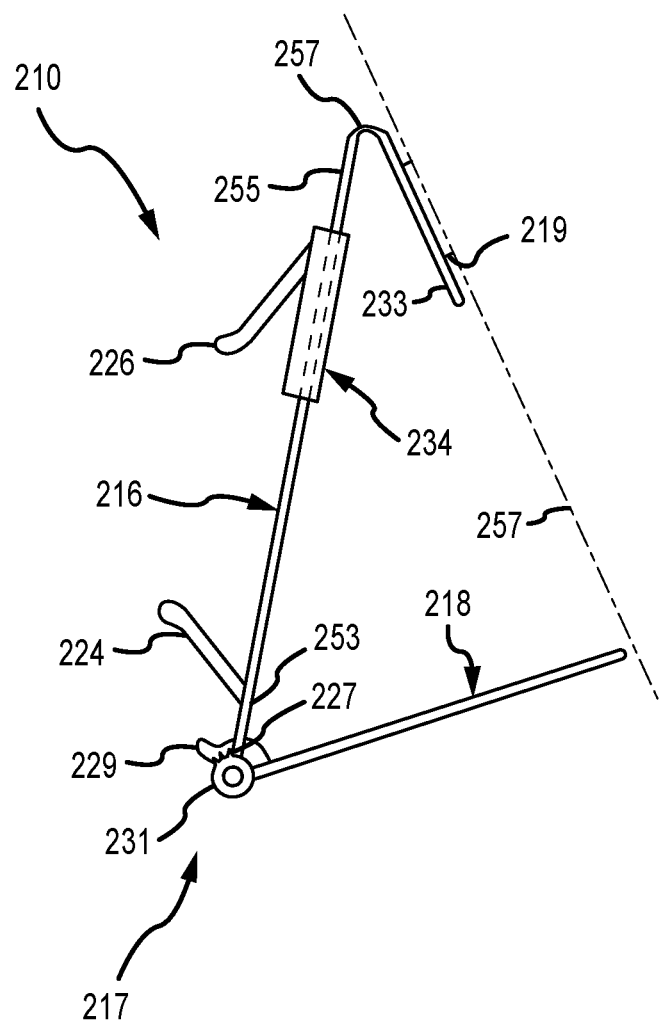
FIG. 13 is a side view in elevation of yet another embodiment of the mobile device holder having an extended back member portion for engaging a mounting surface.

Yet another embodiment 210 of a mobile device holder is illustrated in FIG. 13. Embodiment 210 is similar to embodiment 110 and may comprise a back plate 216 and a strut 218. The back plate 216 of mobile device holder 210 may also be provided with first jaw 224 which may be substantially similar to the first jaws 24, 124 already described. A slider member 234 provided with a second jaw 226 may be slidably mounted to the back plate 216 so that the second jaw 226 can be moved toward and away from first jaw 224 to accommodate a wide range of mobile devices. Slider member 234 and second jaw 226 may be substantially similar to the slider members 34, 134 and second jaws 26, 126 already described for the other embodiments.

Unlike holder embodiments 10 and 110, the strut 218 of holder 210 is pivotally mounted to a lower end 253 of back plate 216 such as, for example, by means of a pivot shaft 231. The pivotal mounting arrangement allows strut 218 to be moved between an opened position and a closed position. In holder embodiment 210, an upper end 255 of back plate 216 may be provided with an extended portion 233. Extended portion 233 may be connected to the upper end 255 of back plate 216 by means of a hinged portion 257, similar to the hinged portions already described for the first embodiment 10. Extended portion 233 of back plate 216 may be provided with a securing member 219 to allow holder 210 to be secured to a mounting surface 257. Strut 218 may then be positioned to hold the back plate 216 at a desired angle with respect to mounting surface 257, as best seen in FIG. 13. A strut lock 217 may be used to hold strut 218 in the desired position. More specifically, and in the particular embodiment illustrated in FIG. 13, strut lock 217 may also comprise a ratchet assembly wherein a set of teeth 227 provided on pivot shaft 231 are sized to engage a pawl 229 provided on strut 218. The engagement of the pawl 229 with the teeth 227 holds the strut 218 in any of a range of defined positions.

The various components of holder 210 may be fabricated in the same way and from the same type of materials as those already described for holder 10, as would become apparent to persons having ordinary skill in the art after having become familiar with the teachings provided herein.

Figure 14:
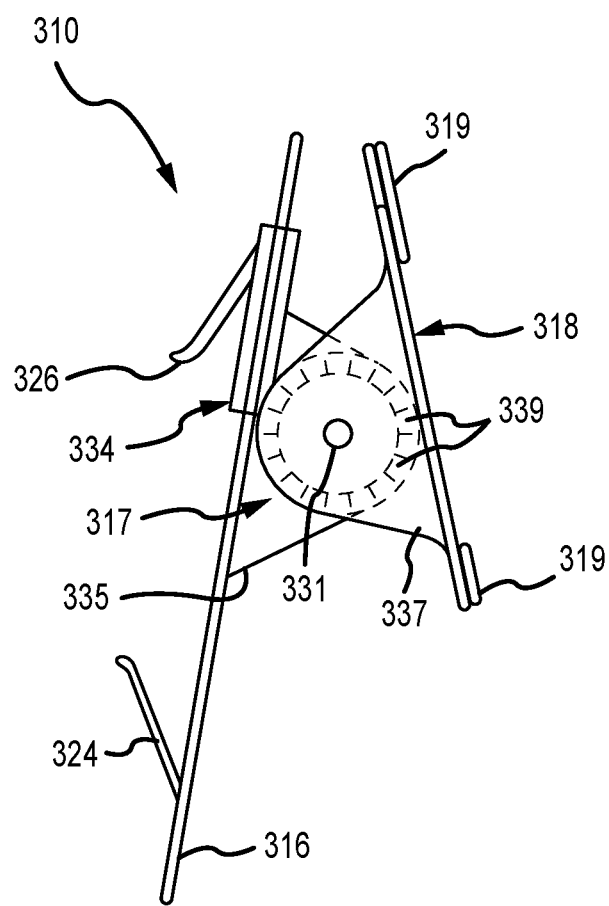
FIG. 14 is a side view in elevation of still yet another embodiment of a mobile device holder with a second type of ratchet assembly for holding the strut and the back plate in a desired position.

Still yet another embodiment 310 of the mobile device holder is illustrated in FIG. 14. Mobile device holder 310 may comprise a back plate 316 and a strut 318. If desired, one or more securing members 319 may be provided on the back surface of strut 318 to allow holder 310 to be secured to a mounting surface. As was the case for the other embodiments, back plate 316 of mobile device holder 310 may also be provided with first jaw 324. First jaw 324 may be substantially similar to the first jaws 24, 124, and 224 already described for the other embodiments. A slider member 334 provided with an second jaw 326 is slidably mounted to the back plate 316 so that the second jaw 326 can be moved toward and away from first jaw 324 to accommodate a wide range of mobile devices. Slider member 334 and second jaw 326 may be substantially identical to the slider members 34, 134, 234 and second jaws 26, 126, 226 for the other embodiments.

In embodiment 310, strut 318 is pivotally mounted to the back plate 316 by means of first and second flanges 335 and 337 that extend from respective side portions of back plate 316 and strut 318. In an alternative embodiment, respective pairs of flanges, i.e., extending from opposite side portions of back plate 316 and strut 318, may be used. In any event (i.e., regardless of whether a single set or a double set of flanges are used), the flanges 335 and 337 may be pivotally connected together, e.g., by means of a pivot shaft 331. The pivotal engagement of flanges 335 and 337 allow the strut 318 to be moved or angled with respect to back plate 316, as shown in FIG. 14. A strut lock assembly 317 (e.g., comprising the ratchet assembly may be used to hold strut 318 in the desired position.

Strut lock assembly 317 may comprise a second type of ratchet assembly wherein the flanges 335 and 337 are provided with respective sets of teeth 339 thereon. The sets of teeth 339 are provided in opposed relationship so that the teeth 339 provided on flanges 335 and 337 are ratchetably engagable with one another to hold the back plate 316 and strut 318 in the desired position.

The various components of holder 310 may be fabricated in the same way and from the same type of materials as those already described for holder 10, as would become apparent to persons having ordinary skill in the art after having become familiar with the teachings provided herein.

Figure 15:
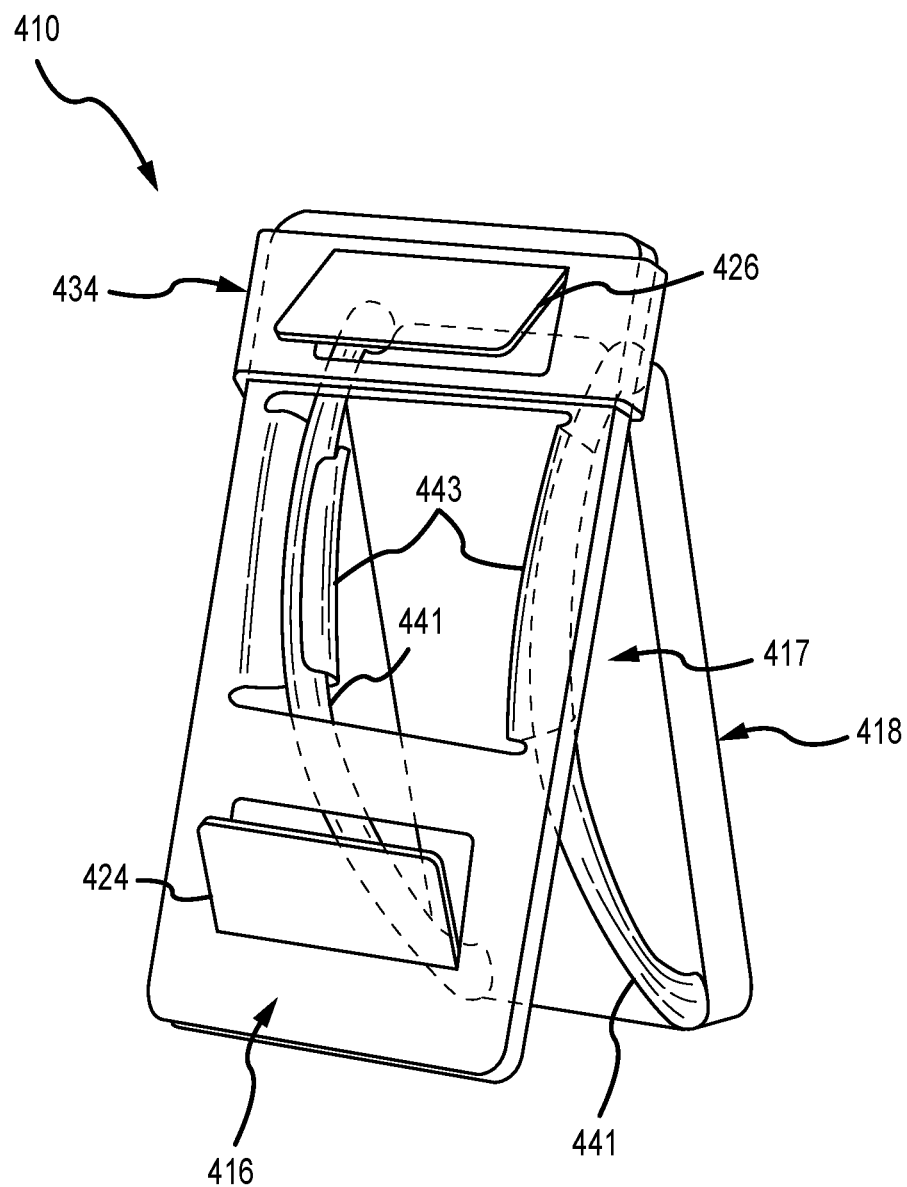
FIG. 15 is a perspective view of a further embodiment of the mobile device holder wherein the strut lock comprises an arcuate mounting member and a clip for holding the strut and back plate in a desired position.

A further embodiment 410 of a mobile device holder is illustrated in FIG. 15. Mobile device holder 410 may comprise a back plate 416 and a strut 418. If desired, one or more securing members (not shown in FIG. 15) may be provided on the back side of strut 418 to allow holder 410 to be secured to a mounting surface in the manner already described for the other embodiments 10, 110, 210, and 310. Back plate 416 of mobile device holder 410 may also be provided with first jaw 424 which may be substantially similar to the first jaws 24, 124, 224, and 324 already described for the other embodiments. A slider member 434 provided with a second jaw 426 is slidably mounted to the back plate 416 so that the second jaw 426 can be moved toward and away from first jaw 424 to accommodate a wide range of mobile devices. Slider member 434 and second jaw 426 may be substantially identical to the slider members 34, 134, 234, 334 and second jaws 26, 126, 226, 326 of the other embodiments.

In the embodiment illustrated in FIG. 15, strut 418 may be provided with a pair of arcuate mounting members 441 that extend between the proximal and distal ends of strut 418. In one embodiment, the arcuate mounting members 441 are formed of a metal or metal alloy. Alternatively, arcuate mounting members 441 may be formed of the same material (i.e., polypropylene plastic) as the strut 418. Back plate 416 may be provided with a pair of clips 443 that are sized to slidably engage the arcuate mounting members 441 provided on strut 418. The engagement of the clips 443 and arcuate mounting members 441 allow strut 418 to be moved with respect to back plate 416. The engagement of the clips 443 and arcuate mounting members 441 also develops sufficient static friction to hold the back plate 416 and strut 418 in a desired position, thereby defining a strut lock 417. Alternatively, the mounting members 441 and clips 443 could be ratchetably engaged with one another, by means of teeth and pawl arrangements. Still other arrangements are possible, as would become apparent to persons having ordinary skill in the art after having become familiar with the teachings provided herein.

The various components of holder 410 may be fabricated in the same way and from the same type of materials as those already described for holder 10, as would become apparent to persons having ordinary skill in the art after having become familiar with the teachings provided herein.

Figure 16:
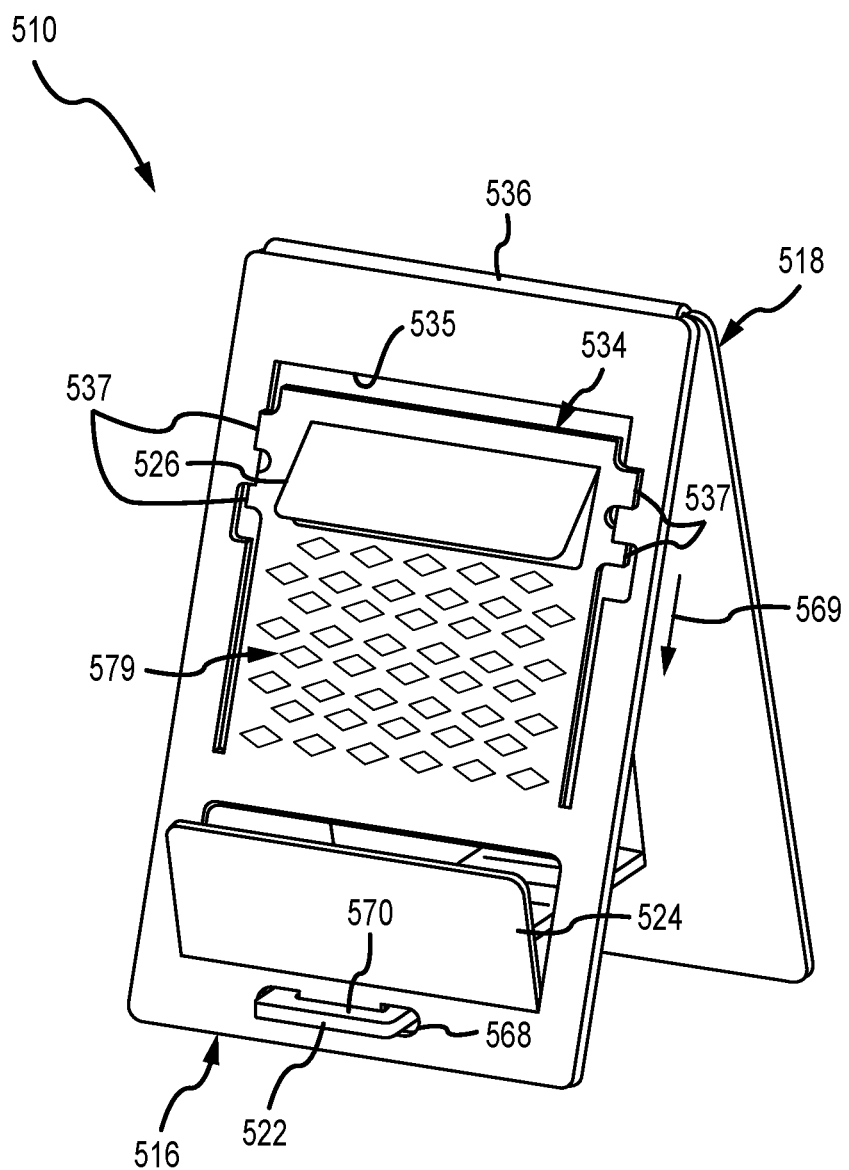
FIG. 16 is a perspective view of still a further embodiment of the mobile device holder having a resilient mesh area for biasing the second jaw toward the first jaw.

Still a further embodiment 510 of a mobile device holder is illustrated in FIG. 16. Mobile device holder 510 may comprise a back plate 516 and a strut 518. Strut 518 may be pivotally connected to the back plate 516 via a hinge portion 536 in a manner substantially identical to that described for the first embodiment 10. Similarly, embodiment 510 may be provided with a spreader 522 that may be substantially identical to spreader 22 of the first embodiment 10. Spreader 522 is sized to engage a tongue 570 defined by opening 568 in back plate 516, again in a manner similar to that already described for holder 10. If desired, one or more securing members (not shown in FIG. 16) may be provided on the back side of strut 518 to allow holder 510 to be secured to a mounting surface. Back plate 516 of mobile device holder 510 may also be provided with first jaw 524 which may be substantially similar to the first jaws 24, 124, 224, 324, and 424 already described for the other embodiments. A slider member 534 provided with an second jaw 526 is slidably mounted to the back plate 516 so that the second jaw 526 can be moved toward and away from first jaw 524 to accommodate a wide range of mobile devices.

However, unlike the slider members of the other embodiments 10, 110, 210, 310, and 410, slider member 534 of embodiment 510 is slidably mounted within an opening 535 defined by back plate 516. Slider member 534 may be guided within opening 535 by a plurality of tabs 537 which may be sized and spaced to slidably engage respective front and rear surfaces of back plate 516. In the particular embodiment illustrated in FIG. 16 slider member 534 is connected to back plate 516 by a resilient expanded mesh portion 579. Resilient expanded mesh portion 579 biases the slider member 534 and second jaw 526 toward first jaw 524, generally in the direction indicated by arrow 569. Such a biasing helps to securely hold the mobile device within holder 510. In one embodiment, all of the various components of the holder 510 may be molded or formed from a single piece of material (e.g., polypropylene plastic), making the holder 510 a single piece assembly.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:
1. A holder for holding a mobile device, comprising:
a back plate defining two generally parallel opposed edges;
a strut operatively associated with said back plate so that said strut can be moved with respect to said back plate;

a strut lock operatively associated with said back plate and said strut, said strut lock holding said back plate and said strut in a desired position;

a first jaw operatively associated with said back plate, said first jaw being sized to engage a portion of the mobile device;

a slider member having a front side and a back side, said slider member having opposed end portions that define respective flanges, the flanges and the back side of said slider member defining respective channels therebetween that are sized to slidably engage the two generally parallel opposed edges defined by said back plate so that said slider member can be moved toward and away from said first jaw; and a second jaw operatively associated with said slider member so that said second jaw can be moved toward and away from said first jaw along with said slider member, said second jaw being sized to engage a portion of the mobile device.

2. The holder of claim 1, wherein a proximal end of said strut is pivotally mounted to said back plate and wherein said strut lock comprises a spreader having a proximal end and a distal end, the proximal end of said spreader being pivotally mounted at about the distal end of said strut, the distal end of said spreader being engagable with said back plate to hold said back plate and said strut in the desired position.

3. The holder of claim 2, wherein said back plate defines an opening therein sized to releasably engage the distal end of said spreader.

4. The holder of claim 3, wherein the opening in said back plate defines a tongue portion and wherein the distal end of said spreader defines at least one slot therein sized to receive the tongue portion.

5. The holder of claim 1, wherein said strut lock comprises a ratchet system operatively associated with said strut and said back plate.

6. The holder of claim 5, wherein said back plate comprises a pivot shaft, wherein at least a portion of a proximal end of said strut is engaged with said pivot shaft, and wherein said ratchet system comprises a set of circumferentially spaced teeth provided on at least a portion of said pivot shaft and a pawl mounted to the proximal end of said strut, said pawl being sized to engage at least one tooth of a set of teeth provided on said pivot shaft.

7. The holder of claim 5, wherein said ratchet system comprises a first flange extending from a side portion of said strut and a second flange extending from a side portion of said back plate, said first and second flanges being pivotally mounted to one another, said first and second flanges further comprising respective first and second sets of teeth provided thereon in opposed relationship so that the teeth provided on said first and second flanges are ratchetably engagable with one another to hold said back plate and said strut in the desired position.

8. The holder of claim 1, wherein said strut lock comprises:

an arcuate mounting member mounted to said strut so that said arcuate member extends from about a proximal end of the said strut to about a distal end of said strut; and a clip mounted to said back plate, said clip being sized to slidably engage said arcuate mounting member, the engagement of said clip and said arcuate mounting member allowing said strut to be moved with respect to said back member, the engagement of said clip and said arcuate mounting member developing sufficient static friction to hold said back plate and said strut in the desired position.

9. The holder of claim 1, further comprising a set of teeth provided on said back plate and wherein said slider member further comprises a pawl provided on the back side of said slider member, said pawl being positioned to engage at least one tooth provided on said back plate, the engagement of said pawl and at least one tooth holding the slider member in fixed relation with respect to said back plate.

10. The holder of claim 1, further comprising a securing material provided on at least a portion of said strut, said securing material allowing said holder to be releasably secured to a surface.

11. The holder of claim 10, wherein said securing material comprises a hook portion of a hook and loop fastening system and wherein the surface comprises at least a loop portion that is releasably engagable with the hook portion.

12. The holder of claim 10, wherein said securing material comprises an adhesive foam pad.

13. A method of holding a mobile device in a desired position, comprising:

providing a mobile device holder, the mobile device holder comprising:

a back plate defining two generally parallel opposed edges;

a strut operatively associated with the back plate so that the strut can be moved with respect to the back plate;

a strut lock operatively associated with the back plate and the strut to hold the back plate and the strut in a desired position;

a first jaw operatively associated with the back plate, the first jaw being sized to engage a portion of the mobile device;

a slider member having a front side and a back side, the slider member having opposed end portions that define respective flanges, the flanges and the back side of the slider member defining respective channels therebetween that are sized to slidably engage the two generally parallel opposed edges defined by the back plate so that the slider member can be moved toward and away from the first jaw; and a second jaw operatively associated with the slider member so that the second jaw can be moved toward and away from the first jaw along with the slider member, the second jaw being sized to engage a portion of the mobile device;

positioning a back surface of the mobile device in abutting relationship with the back plate of the mobile device holder so that at least a portion of the first jaw is engaged with a portion of the mobile device; and moving the slider member with respect to the back plate until at least a portion of the second jaw is engaged with a portion of the mobile device so that the mobile device is held between the first and second jaws.

14. The method of claim 13, wherein the mobile device holder comprises a securing material provided on at least a portion of said strut and wherein said method further comprises urging the strut against a surface with a force sufficient to engage the securing material with the surface, the securing material holding the holder and attached mobile device to the surface.

* * * * *